United States Patent [19]

Dunfield et al.

[11] Patent Number: 5,545,937

[45] Date of Patent: Aug. 13, 1996

[54] INTEGRATED PASSIVE MAGNETIC BEARING SYSTEM AND SPINDLE PERMANENT MAGNET FOR USE IN A SPINDLE MOTOR

[75] Inventors: John C. Dunfield, Santa Cruz; Kamran Oveyssi, Aptos, both of Calif.

[73] Assignee: Seagate Technology, Inc., Scotts Valley, Calif.

[21] Appl. No.: 478,270

[22] Filed: Jun. 7, 1995

Related U.S. Application Data

[63] Continuation of Ser. No. 201,798, Feb. 25, 1994, abandoned.

[51] Int. Cl.⁶ .................. H02K 7/14; H02K 7/09
[52] U.S. Cl. .................. 310/90.5; 310/67 R; 360/99.04
[58] Field of Search ................ 310/67 R, 90, 310/90.5; 360/98.07, 79.04, 99.08

[56] References Cited

U.S. PATENT DOCUMENTS

| | | | |
|---|---|---|---|
| 5,168,186 | 12/1992 | Yashiro | 310/156 |
| 5,223,758 | 6/1993 | Kataoka et al. | 310/90.5 |
| 5,280,208 | 1/1994 | Komura et al. | 310/90.5 |
| 5,325,006 | 6/1994 | Uno et al. | 310/90.5 |

FOREIGN PATENT DOCUMENTS

| | | | |
|---|---|---|---|
| 588490 | 3/1994 | European Pat. Off. | 310/90.5 |
| 60-241518 | 11/1985 | Japan | 310/90.5 |
| 3-256547 | 11/1991 | Japan | 310/90.5 |
| 4-150753 | 5/1992 | Japan . | |

*Primary Examiner*—Clayton E. LaBalle
*Attorney, Agent, or Firm*—Flehr, Hohbach, Test, Albritton & Herbert

[57] ABSTRACT

An apparatus for rotatably journaling a rotor of a spindle motor about a stator comprising a plurality of magnetic bearings for use in a disc drive including an annular ring single-pole magnet which is integral with the spindle permanent magnet of a spindle motor rotor assembly and disposed in opposition to a complementary annular magnet ring attached to the stator assembly of the spindle motor. These magnetic bearings in conjunction with an axial pivot form a radially stable bearing system for maintaining rotor displacement about the stator in conjunction with a conventional axial pivot. The present invention provides for the unique combination of magnetic bearings with other conventional pivots for use in disc drive systems.

32 Claims, 8 Drawing Sheets

INTEGRATED PASSIVE MAGNETIC BEARING SYSTEM AND SPINDLE PERMANENT MAGNET FOR USE IN A SPINDLE MOTOR

This is a continuation of application Ser. No. 08/201,798 filed Feb. 25, 1994, now abandoned.

The present invention relates generally to disc drive systems and particularly to an apparatus for rotatably journaling a rotor of a spindle motor about a stator. The present invention comprises a plurality of magnetic bearings for use in a disc drive including an annular ring single-pole magnet which is integral with the spindle permanent magnet of a spindle motor rotor assembly and disposed in opposition to a complementary annular magnet ring attached to the stator assembly of the spindle motor. These magnetic bearings in conjunction with an axial pivot form a radially stable bearing system for maintaining rotor displacement about the stator in conjunction with a conventional axial pivot. The present invention provides for the unique combination of magnetic bearings with other conventional pivots for use in disc drive systems.

BACKGROUND OF THE INVENTION

The present invention provides an improvement to the basic disc drive spindle motor in which ball bearings are utilized to journal a rotor about a shaft in a spindle motor. The embodiments of the present invention are designed to incorporate a magnetic bearing and spindle permanent magnet in a disc drive providing for a unique application of the known technology to improve disc drive motor performance.

Traditionally, disc drive designers have utilized conventional mechanical ball bearing assemblies as a means of rotatably journaling drive components. However, the use of conventional ball bearing assemblies in conjunction with high rotational speed devices has evidenced problems which are deleterious to drive system performance. Specifically, conventional mechanical bearings used are subject to metal wear, vibration/shock and friction problems. In order to alleviate the problems associated with conventional mechanical bearings, magnetic bearings may be substituted, thereby improving overall system performance. The use of magnetic bearings to improve disc drive system performance was disclosed in the concurrently filed U.S. patent application Ser. No. 08/201,676, filed Feb. 25, 1994 entitled "Passive Magnetic Bearings for a Spindle Motor" by Dunfield et al., and is expressly incorporated herein by reference.

Spindle motors and the use of permanent and electromagnets in a disc drive is well known in the art. The combination of a permanent magnet attached to a rotor interacting with an electromagnet assembly attached to a fixed stator as a means of journaling a disc about a stationary shaft is well known in the art. In the prior art, spindle permanent magnets served only as a means for rotating the rotor about the stator via an axial pivot. Separate means for maintaining the physical relationship between the rotor and the stator, namely conventional ball bearing systems, were previously employed. These separate means required extra space considerations, additional piece parts, lubricants and contributed to the overall manufacturing cost of the final product.

In the competitive disc drive industry, the optimization of the size of each component directly leads to smaller overall footprint for disc drives. Disc drive size, cost and performance are benchmarks for comparison in the industry. As such, process and design improvements which tend to integrate components and or component functions would be well received in the industry.

SUMMARY OF THE INVENTION

It is the object of the present invention to provide an apparatus for rotatably journaling a rotor of a spindle motor about a shaft by means of a magnetic bearing assembly integral to the spindle permanent magnet of the spindle motor.

It is another object of the present invention to provide a spindle motor having a spindle permanent magnet which produces sufficient torque to spin the motor while incorporating a magnetized region which interacts with a stationary magnet region so as to maintain the physical relationship between the rotor and stator of the spindle motor.

It is another object of the present invention to provide a radially or axially stable bearing assembly for use in a disc drive motor.

It is another object of the present invention to provide a bearing assembly for use in a disc drive that is not susceptible to wear or damage from repeated shocks.

It is a further object of the present invention to provide a bearing assembly for use in a disc drive which minimizes the particulate contamination introduced into the sealed disc drive environment.

It is a further object of the present invention to provide a balanced bearing assembly for use in a disc drive which has minimal losses and a substantially improved non-repeatable run-out characteristic as compared to prior art ball bearing systems.

It is a further object of the present invention to provide a magnetic bearing system for use in a disc drive in which physical size is optimized while providing sufficient directional stiffness.

It is a further object of the present invention to provide a low noise bearing system for minimizing the audible acoustic noise attributable to the operation of the bearing system.

It is a further object of the present invention to provide a bearing assembly for use in a disc drive which has minimal and stable vibration generation characteristics as compared to prior art ball bearing systems.

It is a further object of the present invention to provide a magnetic bearing for use in combination with a hydrodynamic bearing thereby providing the equivalent directional stiffness to a conventional ball bearing system.

It is a further object of the present invention to minimize the height of a spindle motor by integrating components to reduce the overall drive profile.

Finally, it is an object of the present invention to minimize the friction in the bearing assemblies of disc drive motors thereby extending bearing life and maximizing the mean time before failure for the bearing assembly.

In accordance with these and other objects of the invention, an apparatus is provided comprising a spindle permanent magnet having a first magnetized region comprised of a plurality of stacked poles, and a second region comprised of a single pole separated by a non-magnetized spacer region. The integrated spindle permanent magnet is disposed on the inside surface of a rotor adjacent to a like plurality of complementary radially aligned electromagnet poles which are disposed on the stator assembly. A like aligned single pole is fixedly attached to the stator and disposed in opposition to the second magnetized region having like aligned pole of the integrated spindle permanent magnet. The single poles are disposed on both the rotor and stator in attraction mode with opposite poles facing one another, or in opposition mode with a complete or partial offset thereby forming a stable magnetic bearing for maintaining rotor displacement about the stator in conjunction with a conventional pivot.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
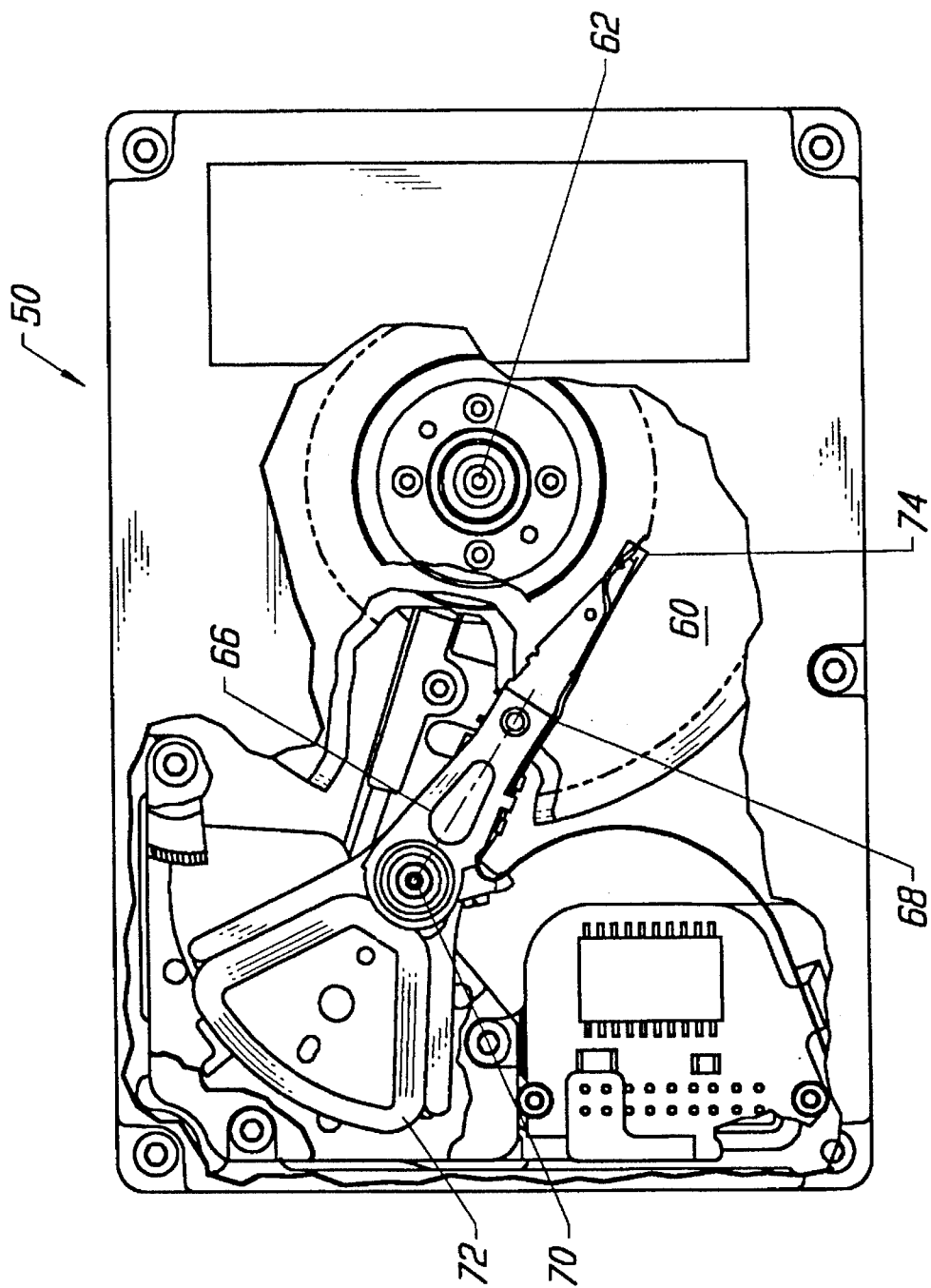
FIG. 1 is a plan view of a disc drive incorporating the first embodiment of the present invention.

Referring to FIG. 1, there is shown an cut-away view of an entire disc drive assembly 50 incorporating the preferred embodiment. A disc 60 is journaled about a shaft 62 which is in turn rotated by a spindle motor 64 (not shown). An actuator arm assembly 66 includes a substantially triangular shaped actuator arm 68 having a pivot point 70 around which the arm 68 rotates. A motor assembly 72 is attached to one end of arm 68 to provide the force required to pivot the arm 68 about the pivot point 70. Located at the other end of arm 68 is a read/write head assembly 74. In combination, the motor assembly 72 provides the force to rotate arm 68 about pivot 70 so as to position the read/write head assembly 74 adjacent to a specified position on the disc 60. The disc 60 is rotated such that the read/write heads fly over the surface of the disc 60 able to read or write data to and from the disc surface.

Figure 2:
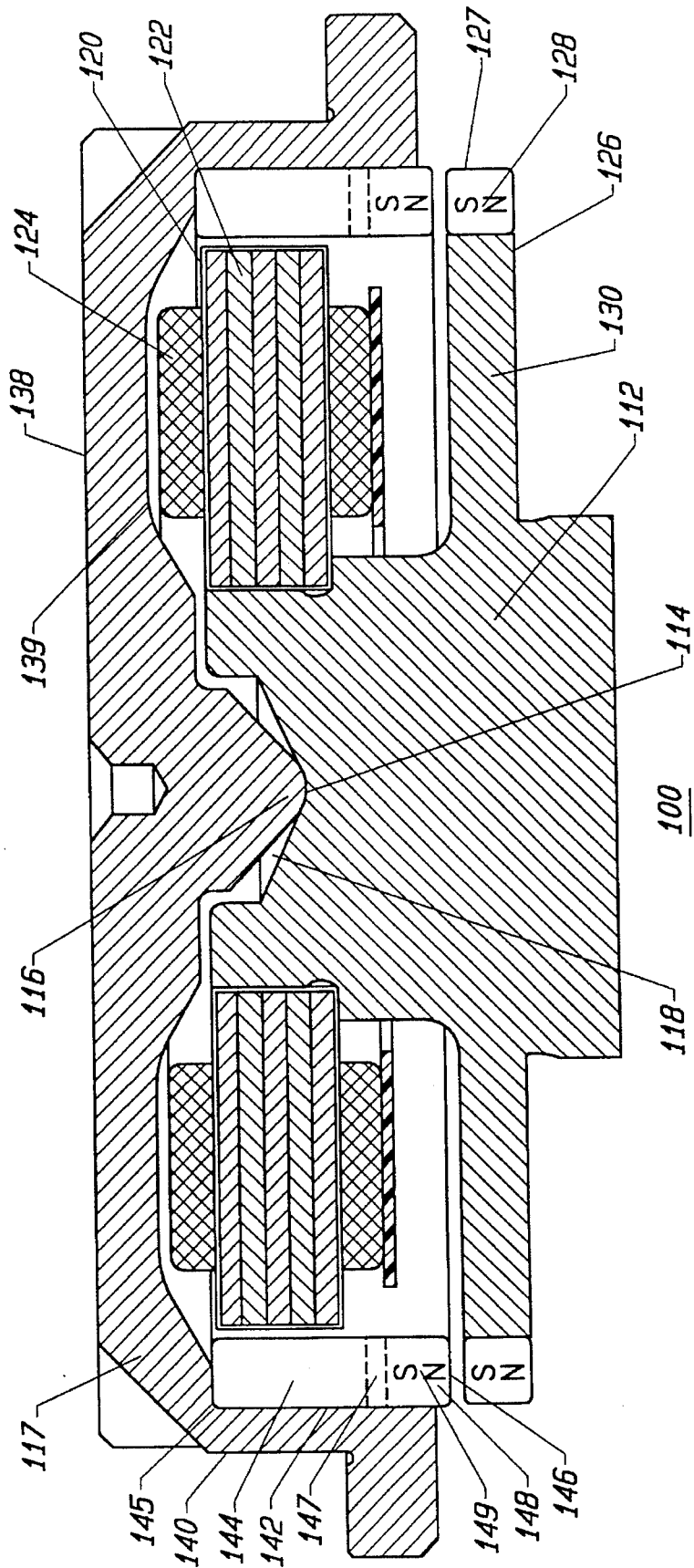
FIG. 2 is a cut away view of a disc drive spindle motor incorporating the first embodiment of the present invention.

Referring to FIG. 2, there is shown a cut-away view of a spindle motor assembly 100 for use in a disc drive incorporating a first embodiment of the present invention. Spindle motor assembly 100 includes a stator 112 having an axial pivot 114 around which a hub shaft 116 of the rotor 117 rotates. In a first embodiment of the present invention a conventional bearing 118 facilitates the pivoting of the hub shaft 116 about the stator 112. Those ordinarily skilled in the art will recognize that a plurality of bearing types may be utilized at the axial pivot 114 including hydrodynamic, conventional, ceramic or ruby ball bearing systems, and as such the disclosure of a conventional bearing should in no way be construed as limiting. Additionally, the present invention is equally suited for fixed as well as a rotating shaft system as disclosed in the first embodiment.

Disposed on the fixed stator 112 is a plurality of stator windings 120 each comprising a permanent magnet assembly 122 surrounded by coil windings 124. The motor as shown depicts a laminated stator but it may also be of the ironless or basketweave type with low air gap unbalance force. Below the stator windings 120, a first annular disc 126 is disposed on the base of the stator 112 forming the lower portion of the magnetic bearing. The first annular disc 126 includes an outer portion 127 extending from its periphery inward formed from a single pole magnet ring 128. In the preferred embodiment the disc is 1.0 mm in diameter, and 1.0 mm in height. The single pole magnet ring 128 is oriented parallel to the axis of rotation, with the south pole facing the rotor 117.

In the preferred embodiment of the present invention, between the base of the stator 112 and the magnet ring 128 lies a non-magnetic spacer ring region 130. The spacer ring 130 may be eliminated or reduced in size to accommodate more poles in the magnetic ring 128 as required for any particular application. If eliminated, then some means of restricting the magnetic path through the shaft must be accomplished in order to maintain magnetic circuit integrity.

The rotor 117 is substantially drum shaped with a centrally disposed hub shaft 116 extending from the interior of the drum for engaging with the axial pivot 114. The rotor 117 further comprises a top 138, interior face 139, exterior side 140 and interior wall 142. Disposed on the interior wall 142 is a spindle permanent magnet 144 in opposition to the laminated steel stack 122 of the stator windings 120. The spindle permanent magnet 144 comprises a first 145 and second end 146. The first end 145 further comprises a plurality of radially aligned poles which oppose the stator laminated steel stack 122 and allow for the movement of the rotor about the stator as the coil windings 124 are alternatively energized. The second end 146 of the spindle permanent magnet 144 comprises a non-magnetized region 147 adjoining an axially magnetized region 148 which forms the top portion of the magnetic bearing.

The axially magnetized region 148 comprises a complementary single pole magnet ring 149 (1.0 mm in diameter, and 1.0 mm in height) disposed on the interior wall 142 of the rotor 117 so as to align perfectly over the first magnet ring 128 which is attached via the annular disc 126 to the stator 112. The complementary single pole magnet ring 149 is formed by axially magnetizing the lower portion of the spindle permanent magnet 144 so as to create the axially aligned pole. The complementary single pole magnet ring 149 comprises a like oriented axially aligned pole which is aligned in attraction mode over the top of the opposing pole of the first annular disc 126. In the first embodiment, the top and bottom portions of the magnetic bearing (annular disc 126 and complementary axially magnetized region 148) are separated by a gap of 0.25 mm.

As the coils of the stator assembly 120 are alternately energized, the interaction of the magnetic fields with the current flow will result in movement of the rotor 117 about the pivot 114. The combination of the annular disc 126 and axially magnetized region 148 act in concert as a magnetic bearing, and as configured, provide balance, radial stiffness and axial preload to the completed assembly. The effect of the complementary magnet pairs in attraction about the entire circumference of the rotor provides a balanced force evenly distributed over the entire rotor, thereby providing axial preload and balance. In this embodiment, radial stiffness is provided by the combination of the magnetic bearing working in conjunction with the hydrodynamic bearing during operation. In this configuration, the complementary discs are resistant to radial shocks as the attraction forces of the complementary poles in the magnet rings 128 and 149 are at a maximum.

One ordinarily skilled in the art would recognize that as compared to conventional ball bearing systems, the radial stiffness developed in the single pole configuration of the preferred embodiment is at least a two orders of magnitude less than that provided by conventional ball bearing systems. However, the magnetic bearings are lossless, do not generate acoustic noise, are easily characterizable as to vibration frequencies, are not subject to wear or friction problems and perform consistently over life. While some finite minimum amount of radial stiffness is required to maintain a functional system (greater than 30,000 N/m), a lesser degree of radial stiffness can be compensated for by the servo control and feedback system or augmented by the use of the combination of magnetic bearings with other more radially stable bearing types, specifically hydrodynamic bearing systems.

Figure 3:
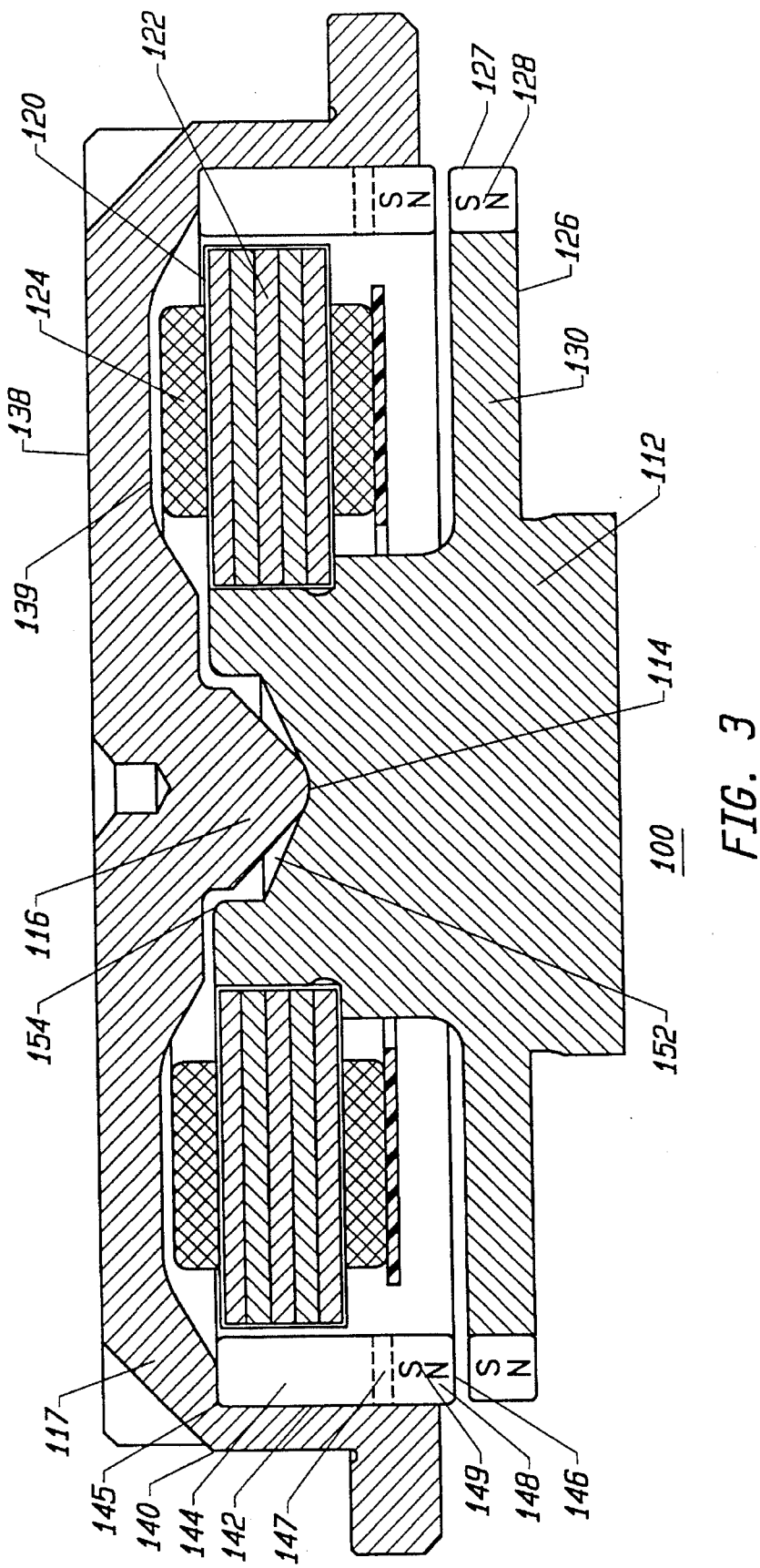
FIG. 3 is a cut away view of a disc drive spindle motor incorporating the first embodiment of the present invention including a hydrodynamic bearing for greater radial stiffness.

Referring now to FIG. 3, the first embodiment of the present invention is shown including a hydrodynamic bearing 152 for increased radial stiffness. In this embodiment a hydrodynamic bearing 152 is utilized at the pivot 114. Those ordinarily skilled in the art, will recognize that while the disc 60 (not shown) is in motion, fluid (or air) utilized in the hydrodynamic bearing will fill the space between the hub shaft 116 and the stator well 154 which constitutes a fluid (air) reservoir. As the pressure develops in the bearing, radial stiffness will increase, thereby augmenting the radial stiffness provided by the stand alone magnetic bearing, yielding a significant increase over the radial stiffness provided by a magnetic bearing/conventional pivot configuration. While the hydrodynamic bearing only adds radial stiffness upon operation (spin up), the combination of the hydrodynamic bearing and the magnetic bearing offers other benefits including dampening for non-operational shock attenuation as provided by the fluid reservoir system. As such the combination of the hydrodynamic bearing and the magnetic bearing offers a novel solution particularly well suited to use in a disc drive bearing system.

The magnetic bearing/hydrodynamic bearing pair also minimizes the motor start torque requirements of the spindle motor assembly 100. It is well known in the art, that after a hydrodynamic bearing comes to rest, contact often occurs between the hub shaft 116 and the side walls of the stator well 154. This is due to the lack of pressure in the hydrodynamic bearing which allows the fluid (or air) in the bearing to recede controlled by the laws of gravity. As such, upon start up, the hydrodynamic bearing requires a large motor torque to break free the metal to metal contact developed as the hub shaft comes to rest against the stator well side walls. The novel combination of the hydrodynamic bearing used as an axial pivot in conjunction with the magnetic bearing eliminates this motor start torque problem. Due to the attraction mode orientation of the complementarily aligned poles, upon coming to rest, the bearing system of the present invention would maintain the hub shaft 116 centrally disposed in the stator well 154, thereby eliminating any friction contact at start up. This alignment capability is unique to the magnetic bearings of the present invention.

Figure 4:
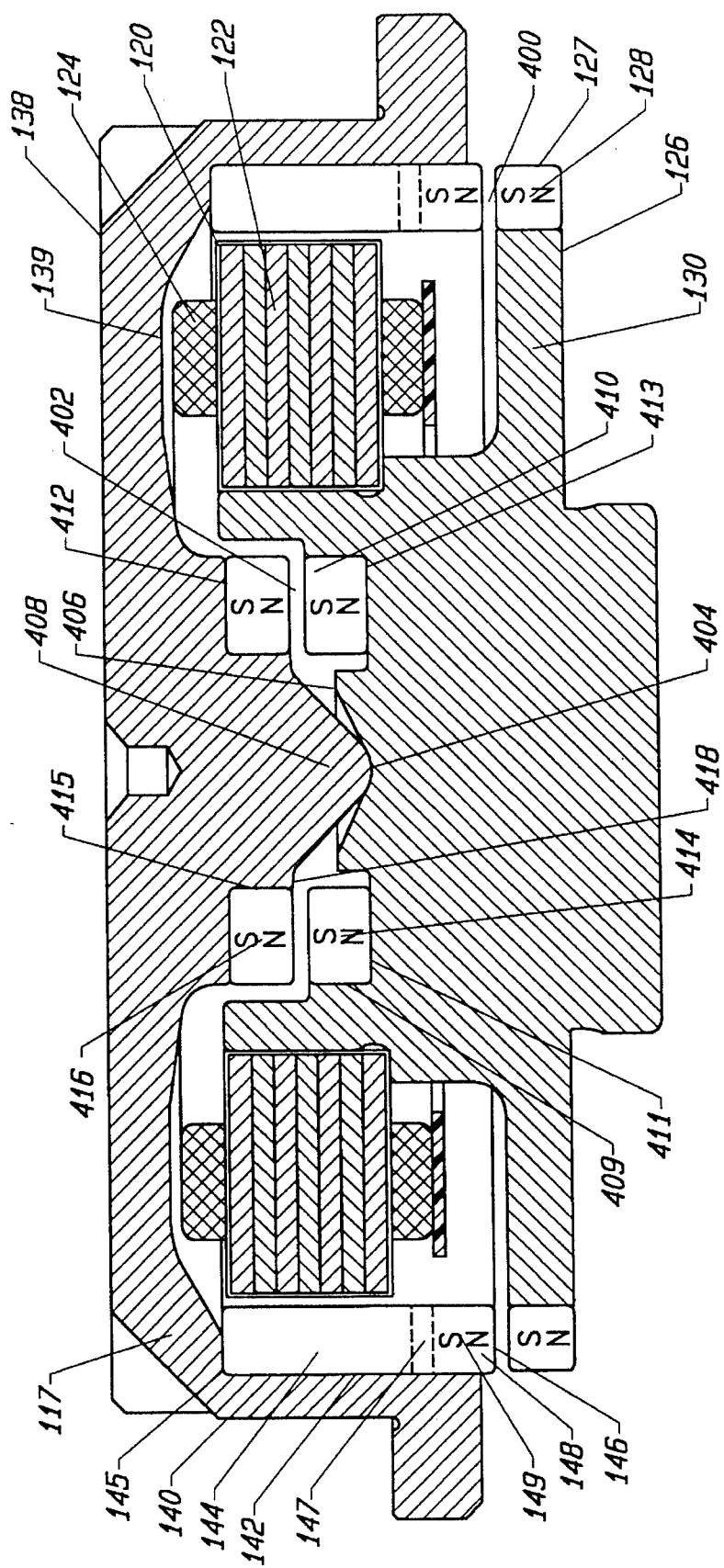
FIG. 4 is a cut away view of a disc drive incorporating an alternative embodiment of the present invention for use in a motor having a magnetic bearing in attraction mode at the top and bottom of the motor along with a top pivot.

Referring next to FIG. 4, a second embodiment of the invention will be described using like numbers for like parts. In this embodiment, a first 400 and second magnetic bearing 402 in attraction mode are provided for use in a motor having a conventional pivot 404 located at the top of the motor as well as a taller laminated steel stack 122. Those ordinarily skilled in the art will recognize that as the size of the laminated steel stack 122 is increased to improve motor performance, a corresponding increases occurs in the attractive forces (radial) of the permanent magnet of the spindle motor to the steel of the stator. In order to maintain rotor balance, these forces must be offset. In this embodiment, a two magnetic bearing configuration was selected to accommodate for the larger radial attractive forces describe above, thereby increasing the radial stiffness and axial pre-load provided over a single magnetic bearing configuration. Again, as noted above, the radial stiffness provided by the two magnetic bearing configuration can be augmented further as required by other means including, but not limited to, the use of a hydrodynamic bearing in conjunction with a longer hub shaft.

The magnetic bearing 400 is comprised of a first annular disc 126 attached to the stator 112 and an axially magnetized region 148 attached to the rotor 117. Below the stator windings 120, a first annular disc 126 is disposed on the base of the stator 112 forming the lower portion of the magnetic bearing. The first annular disc 126 includes an outer portion 127 extending from its periphery inward formed from a single pole magnet ring 128. The single pole magnet ring 128 is oriented parallel to the axis of rotation, with the south pole facing the rotor 117.

Between the base of the stator 112 and the magnet ring 128 lies a non-magnetic spacer ring region 130. The spacer ring 130 may be eliminated or reduced in size to accommodate more poles in the magnetic ring 128 as required for any particular application. If eliminated, then some means of restricting the magnetic path through the shaft must be accomplished in order to maintain magnetic circuit integrity.

The rotor 117 is substantially drum shaped with a centrally disposed hub shaft 116 extending from the interior of the drum for engaging with the axial pivot 404. The rotor 117 further comprises a top 138, interior face 139, exterior side 140 and interior wall 142. Disposed on the interior wall 142 is a spindle permanent magnet 144 in opposition to the laminated steel stack 122 of the stator windings 120. The spindle permanent magnet 144 comprises a first 145 and second end 146. The first end 145 further comprises a plurality of poles magnetized in a radial direction which oppose the stator laminated steel stack 122 and allow for the movement of the rotor about the stator as the coil windings 124 are alternatively energized. The second end 146 of the spindle permanent magnet 144 comprises a non-magnetized spacer region 147 and axially magnetized region 148 which forms the top portion of the magnetic bearing.

The axially magnetized region 148 comprises a complementary single pole magnet ring 149 disposed on the interior wall 142 of the rotor 117 so as to align perfectly over the first magnet ring 128 which is attached via the annular disc 126 to the stator 112. The complementary single pole magnet ring 149 comprises a like oriented axially aligned pole which is aligned in attraction mode over the top of the opposing pole of the first annular disc 126. In the first embodiment, the top and bottom portions of the magnetic bearing (annular disc 126 and complementary axially magnetized region 148) are separated by a gap of 0.25 mm.

The stator 112 includes a top portion 406 configured for receiving the hub shaft 408 at the pivot 404. The top portion 406 includes a ledge 409 fashioned along the edge of the top portion and a support base 411. The second magnetic bearing 402 comprises a bottom annular disc 410 disposed on the top portion of the stator 406 and a top annular disc 412 disposed on the interior face 139 of the rotor 117.

The bottom annular disc 410 includes an outer portion 413 which is fixably attached to the ledge 409 of the stator 112 and formed from a single pole magnet 414. The single pole magnet 414 is oriented parallel to the axis of rotation, with the south pole facing the rotor 117. The bottom annular disc 410 is fixedly attached and journaled about the stator 112 via an aperture 415 in the disc 410. The stator 112 includes a top portion 406 configured for receiving the hub shaft 408 at the pivot 404. The top portion 406 includes a ledge 409 fashioned along the edge of the top portion whose inside diameter matches the outside diameter of the bottom annular disc 410. In this way, the stator 112 is capable of receiving the bottom annular disc 410 by allowing the aperture 415 to pass over the pivot 404, and thereafter support the bottom annular disc 410 as the disc comes in contact with the support base 411 forming the bottom of the ledge 409. In this embodiment, no spacer region is provided between the annular disc 410 and the stator 112, however one may be added as required to align the poles of the magnetic bearing assembly.

The top annular disc 412 comprises a complementary single pole magnet 416 disposed on the interior wall 142 of the rotor 117 so as to align perfectly over the bottom single pole magnet 414 of the bottom annular disc 410 which is attached to the stator 112. The complementary single pole magnet 416 comprises a like oriented axially aligned pole which is aligned in attraction mode over the top of the opposing pole of the bottom annular disc 410. The top annular disc 412 is fixedly attached to the underside of the rotor 117 on the interior face 139 by an adhesive. In this embodiment, an epoxy model "642" manufactured by Locktite was selected to bond the top annular disc 412 to the surface of the rotor 117. Those ordinarily skilled in the art will recognize that the top annular disc 412 may be attached by any of a variety of methods including bonding, or other means. The selection of the epoxy "642", should in no way be construed as limiting.

In this embodiment, the interior face 139 of the rotor 117 includes a support flange 418 located at the junction of the interior face 139 and the hub shaft 408 extending about the entire circumference of the interior of the rotor 117. The support flange 418 provides radially support for the top annular disc 412 as the rotor 117 rotates about the pivot 404. The top annular disc 412 includes an aperture 420 (not shown) which allows the annular disc to be mounted to the interior face 139 of the rotor 117. The hub shaft 408 passes through the aperture 420 extending and forming a junction with the stator 112 at the pivot 404. The aperture must at least allow for the hub shaft to pass, but may be larger depending on the configuration of the magnets in the magnetic bearing 402. In this embodiment, the top and bottom portions of the magnetic bearing (bottom annular disc 410 and complementary top annular disc 412) are separated by a gap of 0.25 mm.

Figure 5:
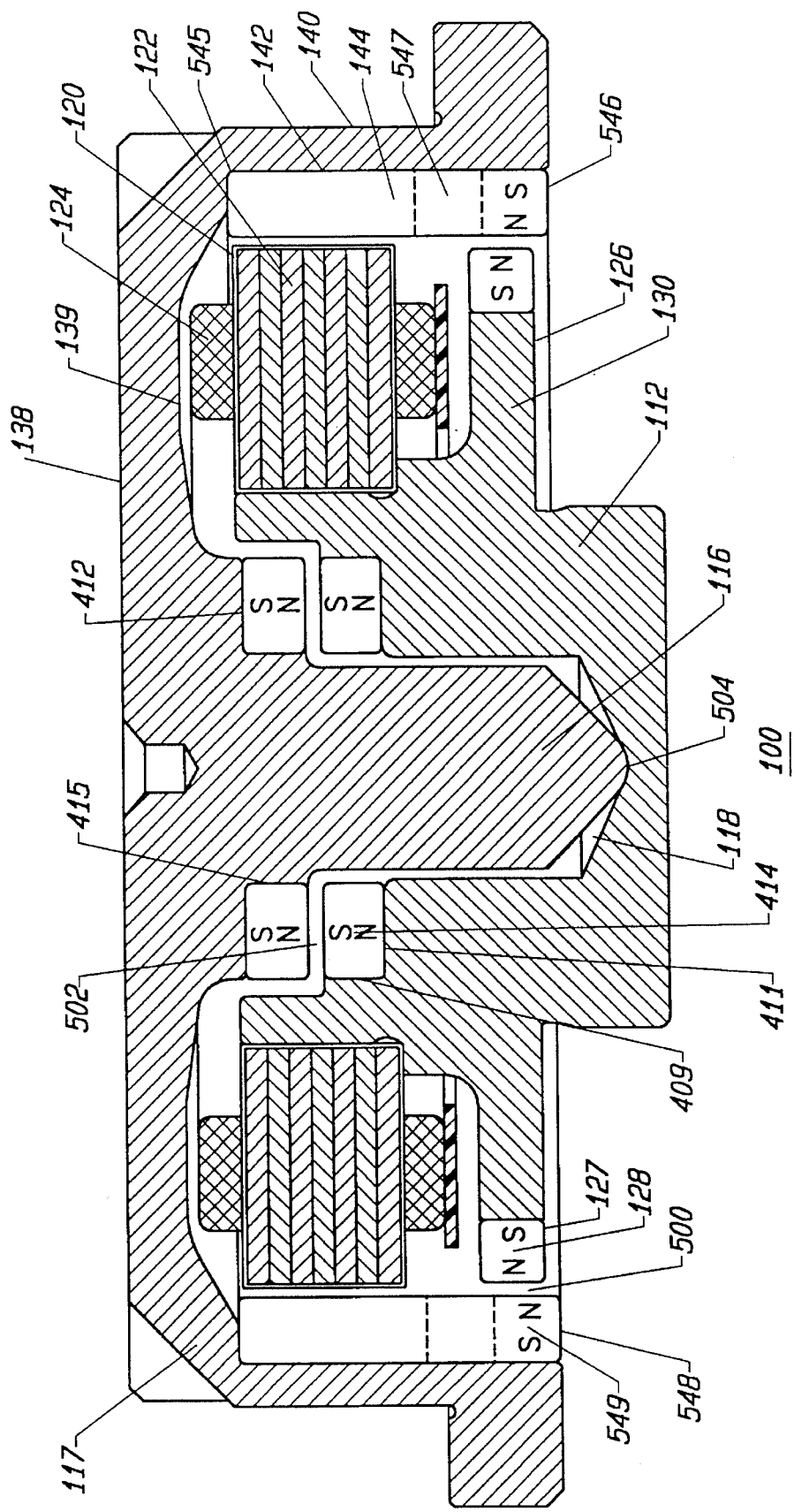
FIG. 5 is a cut away view of a disc drive incorporating a third embodiment of the present invention for use in a motor having a magnetic bearing in attraction mode and a pivot located at the top of the motor, as well as a magnetic bearing in repulsion mode with slight offset located at the bottom of the motor.

Referring next to FIG. 5, a third embodiment of the invention will be described using like numbers for like parts.

In this embodiment, a first magnetic bearing 500 in attraction mode and a second magnetic bearing 502 in repulsion mode are provided for use in a motor having a conventional pivot 504 located at the bottom of the motor as well as a taller laminated steel stack 122. Those ordinarily skilled in the art will recognize that as the size of the laminated steel stack 122 is increased to improve motor performance, a corresponding increases occurs in the attractive forces (radial) of the permanent magnet of the spindle motor to the steel of the stator. In order to maintain rotor balance, these forces must be offset. In this embodiment, a two magnetic bearing configuration was selected to accommodate for the larger radial attractive forces describe above, thereby increasing the radial stiffness and axial pre-load provided over a single magnetic bearing configuration. Specifically, the second magnetic bearing 502 is provided in repulsion mode with a radial orientation thereby providing a strong counter force to the attractive radial forces of the permanent magnet on the rotor to the stator steel. Again, as noted above, the radial stiffness provided by the two magnetic bearing configuration can be augmented further as required by other means including, but not limited to, the use of a hydrodynamic bearing in conjunction with a longer hub shaft.

The magnetic bearing 500 is comprised of a first annular disc 126 attached to the stator 112 and an radially magnetized region 548 of the spindle permanent magnet 144 attached to the rotor 117. Below the stator windings 120, a first annular disc 126 is disposed on the base of the stator 112 forming the inside portion of the magnetic bearing. The first annular disc 126 includes an outer portion 127 extending from its periphery inward formed from a single pole magnet ring 128. The single pole magnet ring 128 is oriented perpendicular to the axis of rotation, with the north pole facing the rotor 117.

Between the base of the stator 112 and the magnet ring 128 lies a non-magnetic spacer ring region 130. The spacer ring 130 may be eliminated or reduced in size to accommodate more poles in the magnetic ring 128 as required for any particular application. If eliminated, then some means of restricting the magnetic path through the shaft must be accomplished in order to maintain magnetic circuit integrity.

The rotor 117 is substantially drum shaped with a centrally disposed hub shaft 116 extending from the interior of the drum for engaging with the axial pivot 404. The rotor 117 further comprises a top 138, interior face 139, exterior side 140 and interior wall 142. Disposed on the interior wall 142 is a spindle permanent magnet 144 in opposition to the laminated steel stack 122 of the stator windings 120. The spindle permanent magnet 144 comprises a first 545 and second end 546. The first end 545 further comprises a plurality of poles magnetized in a radial direction which oppose the stator laminated steel stack 122 and allow for the movement of the rotor about the stator as the coil windings 124 are alternatively energized. The second end 546 of the spindle permanent magnet 144 comprises a non-magnetized spacer region 547 and radially magnetized region 548 which forms the outside portion of the magnetic bearing.

The radially magnetized region 548 comprises a complementary single pole magnet ring 549 disposed on the interior wall 142 of the rotor 117 so as to align opposing and slightly offset vertically the first magnet ring 128 which is attached via the annular disc 126 to the stator 112. The complementary single pole magnet ring 549 comprises a like oriented axially aligned pole which is aligned in repulsion mode opposing the pole of the first annular disc 126. In the first embodiment, the inside and outside portions of the magnetic bearing (annular disc 126 and complementary radially magnetized region 548) are separated by a gap of 0.25 mm.

The stator 112 includes a top portion 406 configured for receiving the hub shaft 408 at the pivot 404. The top portion 406 includes a ledge 409 fashioned along the edge of the top portion and a support base 411. The second magnetic bearing 402 comprises a bottom annular disc 410 disposed on the top portion of the stator 406 and a top annular disc 412 disposed on the interior face 139 of the rotor 117.

The bottom annular disc 410 includes an outer portion 413 which is fixably attached to the ledge 409 of the stator 112 and formed from a single pole magnet 414. The single pole magnet 414 is oriented parallel to the axis of rotation, with the south pole facing the rotor 117. The bottom annular disc 410 is fixedly attached and journaled about the stator 112 via an aperture 415 in the disc 410. The stator 112 includes a top portion 406 configured for receiving the hub shaft 408 at the pivot 404. The top portion 406 includes a ledge 409 fashioned along the edge of the top portion whose inside diameter matches the outside diameter of the bottom annular disc 410. In this way, the stator 112 is capable of receiving the bottom annular disc 410 by allowing the aperture 415 to pass over the pivot 404, and thereafter support the bottom annular disc 410 as the disc comes in contact with the support base 411 forming the bottom of the ledge 409. In this embodiment, no spacer region is provided between the annular disc 410 and the stator 112, however one may be added as required to align the poles of the magnetic bearing assembly.

The top annular disc 412 comprises a complementary single pole magnet 416 disposed on the interior wall 142 of the rotor 117 so as to align perfectly over the bottom single pole magnet 414 of the bottom annular disc 410 which is attached to the stator 112. The complementary single pole magnet 416 comprises a like oriented axially aligned pole which is aligned in attraction mode over the top of the opposing pole of the bottom annular disc 410. The top annular disc 412 is fixedly attached to the underside of the rotor 117 on the interior face 139 by an adhesive. In this embodiment, an epoxy model "642" manufactured by Locktite was selected to bond the top annular disc 412 to the surface of the rotor 117. Those ordinarily skilled in the art will recognize that the top annular disc 412 may be attached by any of a variety of methods including bonding, or other means. The selection of the epoxy "642", should in no way be construed as limiting.

In this embodiment, the interior face 139 of the rotor 117 includes a support flange 418 located at the junction of the interior face 139 and the hub shaft 408 extending about the entire circumference of the interior of the rotor 117. The support flange 418 provides radially support for the top annular disc 412 as the rotor 117 rotates about the pivot 404. The top annular disc 412 includes an aperture 420 (not shown) which allows the annular disc to be mounted to the interior face 139 of the rotor 117. The hub shaft 408 passes through the aperture 420 extending and forming a junction with the stator 112 at the pivot 404. The aperture must at least allow for the hub shaft to pass, but may be larger depending on the configuration of the magnets in the magnetic bearing 402. In this embodiment, the top and bottom portions of the magnetic bearing (bottom annular disc 410 and complementary top annular disc 412) are separated by a gap of 0.25 mm.

Figure 6:
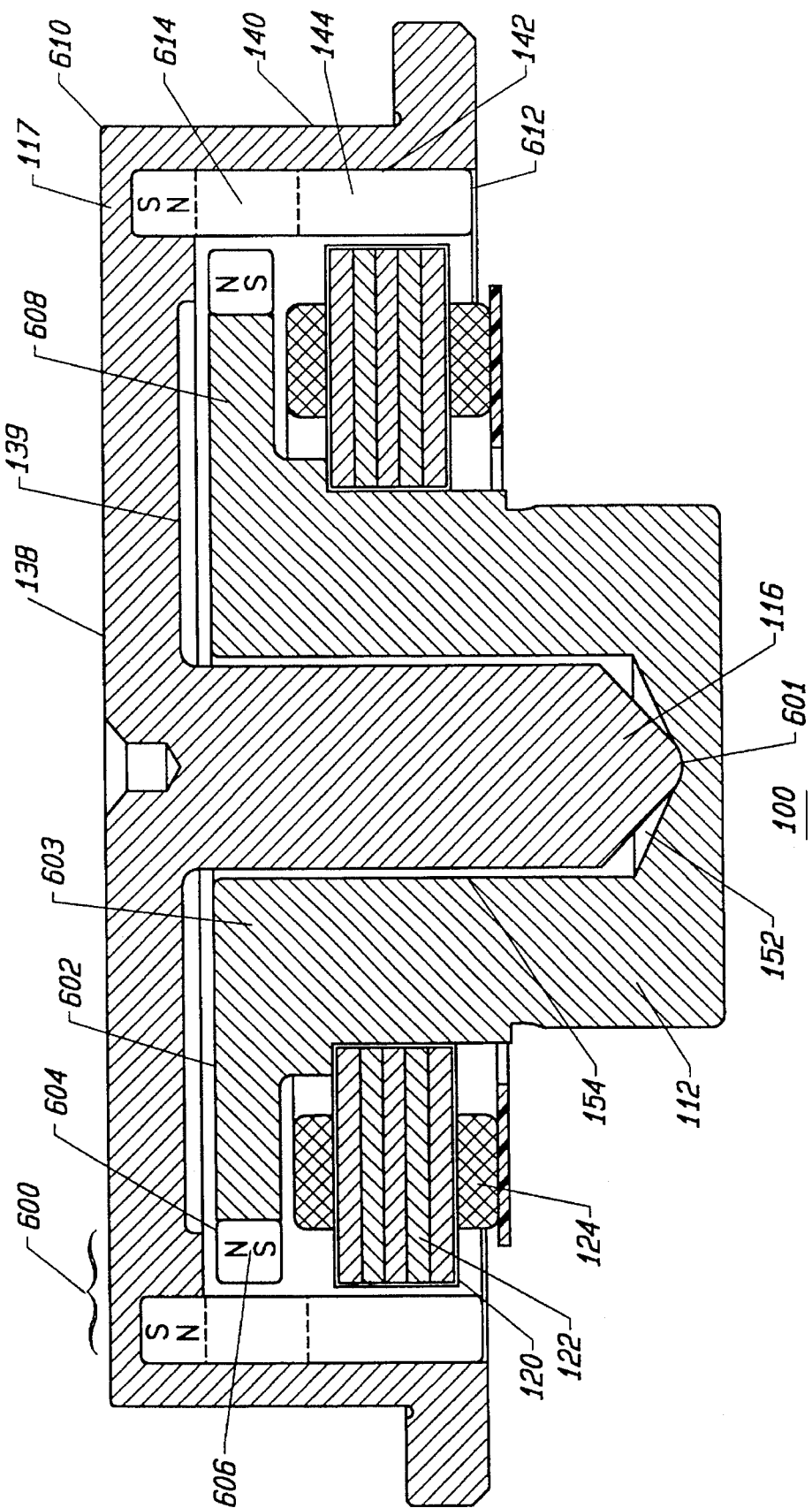
FIG. 6 is a cut away view of a disc drive incorporating a fourth embodiment of the present invention including hydrodynamic bearing used in conjunction with a magnet bearing in repulsion mode and full offset from a complementary pole located on the stator assembly.

Referring next to FIG. 6, a fourth embodiment of the present invention will be described using like numbers to describe like parts. In this embodiment, a spindle motor similar to the first embodiment is provided including a magnetic bearing 600 on top of the motor with a bottom pivot 601. Spindle motor assembly 100 includes a stator 112 having an axial pivot 601 around which a hub shaft 116 of the rotor 117 rotates. In this embodiment of the present invention a hydrodynamic bearing 118 facilitates the pivoting of the hub shaft 116 about the stator 112. Those ordinarily skilled in the art will recognize that a plurality of bearing types may be utilized at the axial pivot 601 including conventional, ceramic or ruby ball bearing systems, and as such the disclosure of a hydrodynamic bearing should in no way be construed as limiting. Additionally, the present invention is equally suited for fixed as well as a rotating shaft system as disclosed in the first embodiment.

Disposed on the fixed stator 112 is a plurality of stator windings 120 each comprising a laminated steel stack 122 surrounded by coil windings 124. The motor as shown depicts a laminated stator but it may also be of the ironless or basketweave type with low air gap unbalance force. Above the stator windings 120, a first annular disc 602 is disposed on the top portion 603 of the stator 112 forming the lower portion of the magnetic bearing. The first annular disc 602 includes an outer portion 604 extending from its periphery inward formed from a single pole magnet ring 606. The single pole magnet ring 606 is oriented parallel to the axis of rotation, with the north pole facing the rotor 117.

Between the base of the stator 112 and the magnet ring 606 lies a non-magnetic spacer ring region 608. The spacer ring region 608 may be eliminated or reduced in size to accommodate more poles in the magnetic ring 606 as required for any particular application. If eliminated, then some means of restricting the magnetic path through the shaft must be accomplished in order to maintain magnetic circuit integrity.

The rotor 117 is substantially drum shaped with a centrally disposed hub shaft 116 extending from the interior of the drum for engaging with the axial pivot 601. The rotor 117 further comprises a top 138, interior face 139, exterior side 140 and interior wall 142. The interior face is recessed at the junction of the interior wall 142 and interior face 139 to receive a first end 610 of a spindle permanent magnet 144. During assembly, the spindle permanent magnet 144 is disposed on the rotor 117, extending into the recess of the interior face 139 and along the interior wall 142 in opposition to the laminated steel stack 122 of the stator windings 120.

The spindle permanent magnet 144 comprises a first 610 and second end 612. The second end 612 further comprises a plurality of poles stacked in an annular disc configuration which oppose the stator laminated steel stack 122 and allow for the movement of the rotor about the stator as the coil windings 124 are alternatively energized. The first end 610 of the spindle permanent magnet 144 comprises a non-magnetized region 614 and axially magnetized region 616 which forms the top portion of the magnetic bearing.

The axially magnetized region 616 comprises a complementary single pole magnet ring 618 disposed in the interior face 139 of the rotor 117 so as to lie in complete offset with respect to the first magnet ring 606 of the annular disc 502. The complementary single pole magnet ring 618 comprises a oppositely oriented axially aligned pole which is aligned in repulsion mode above and offset from the opposing pole of the first annular disc 602. As such, the magnet ring 606 lies in direct opposition to the non-magnetized region 608 and completely offset from the complementary magnet ring 618. In the this embodiment, the annular disc 602 and non-magnetized region 614 are separated by a gap of 0.25 mm.

As the coils of the stator assembly 120 are alternately energized, the interaction of the magnetic fields with the current flow will result in movement of the rotor 117 about the pivot 601. The combination of the annular disc 602 and axially magnetized region 616 act in concert as a magnetic bearing, and as configured, provide balance, radial stiffness and axial preload to the completed assembly. The effect of the complementary magnet pairs in repulsion about the entire circumference of the rotor provides a balanced force evenly distributed over the entire rotor, thereby providing axial preload and balance.

Again, the radial stiffness developed in the single pole configuration of the this embodiment is at least two orders of magnitude less than that provided by conventional ball bearing systems. However, the magnetic bearings are lossless, do not generate acoustic noise, are easily characterizable as to vibration frequencies, are not subject to wear or friction problems and perform consistently over life. While some finite minimum amount of radial stiffness is required to maintain a functional system (greater than 30,000 N/m), a lesser degree of radial stiffness can be compensated for by the servo control and feedback system or augmented by the use of the combination of magnetic bearings with other more radially stable bearing types, specifically hydrodynamic bearing systems.

Those ordinarily skilled in the art, will recognize that while the disc 60 (not shown) is in motion, fluid (or air) utilized in the hydrodynamic bearing will fill the space between the hub shaft 116 and the stator well 154 which constitutes a fluid (air) reservoir. As the pressure develops in the bearing, radial stiffness will increase, thereby augmenting the radial stiffness provided by the stand alone magnetic bearing, yielding a significant increase over the radial stiffness provided by a magnetic bearing/conventional pivot configuration. While the hydrodynamic bearing only adds radial stiffness upon operation (spin up), the combination of the hydrodynamic bearing and the magnetic bearing offers other benefits including dampening for non operational shock attenuation as provided by the fluid reservoir system. As such the combination of the hydrodynamic bearing and the magnetic bearing offers a novel solution particularly well suited to use in a disc drive bearing system. As described previously, the magnetic bearing/hydrodynamic bearing pair also minimizes the motor start torque requirements of the spindle motor assembly 100.

Figure 7:
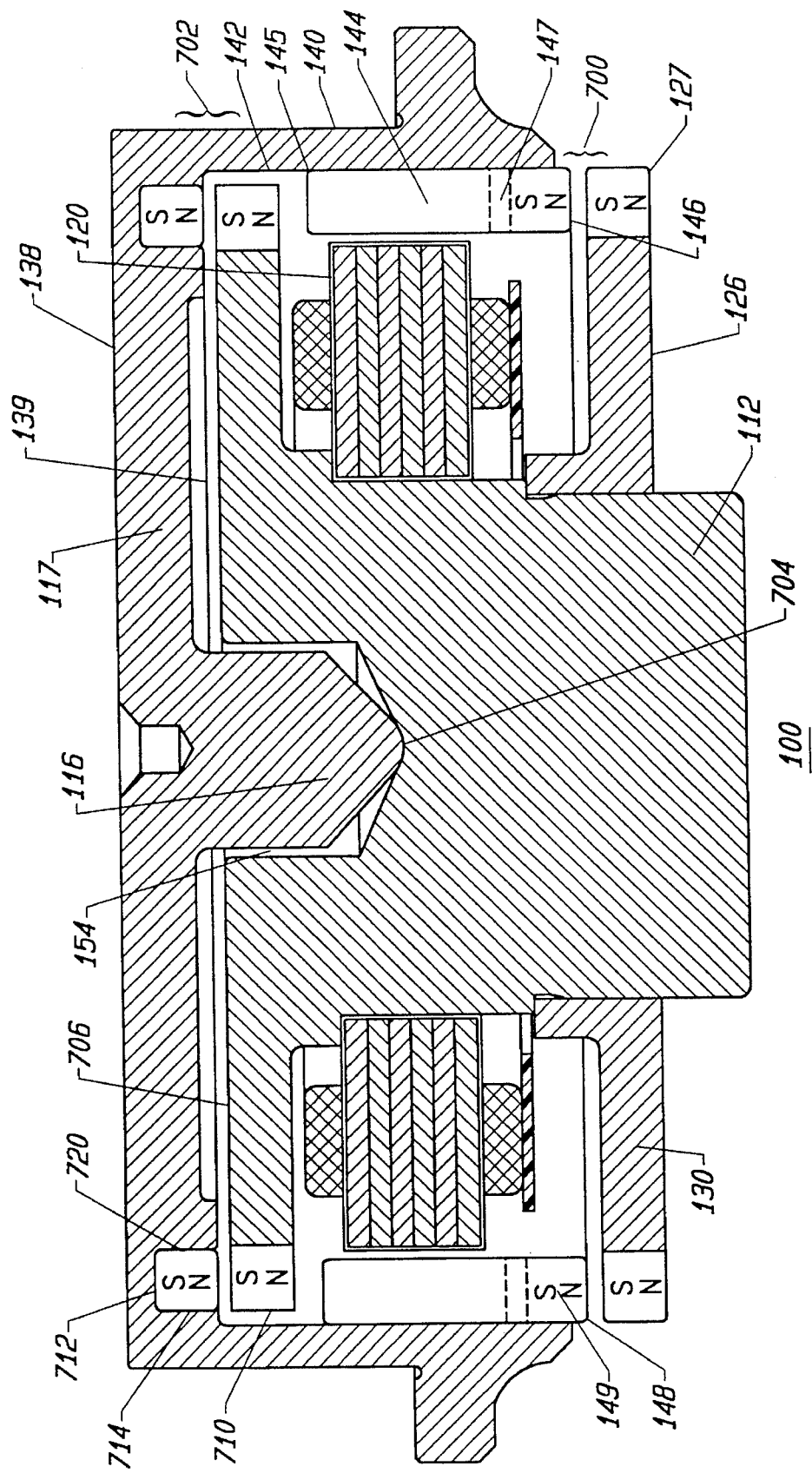
FIG. 7 is a cut away view of a disc drive incorporating a fourth embodiment of the present invention including top and bottom mounted magnetic bearings in attraction mode.

Referring next to FIG. 7, a fifth embodiment of the present invention will be described using like numbers to describe like parts. In this embodiment, a first 700 and second magnetic bearing 702 in attraction mode are provided for use in a motor having a axial pivot 704 located between the two bearings as well as a taller laminated steel stack 122. Those ordinarily skilled in the art will recognize that as the size of the laminated steel stack 122 is increased to improve motor performance, a corresponding increases occurs in the attractive forces (radial) of the permanent magnet of the spindle motor to the steel of the stator. In order to maintain rotor balance, these forces must be offset. In this embodiment, a two magnetic bearing configuration was selected to accommodate for the larger radial attractive forces describe above, thereby increasing the radial stiffness and axial pre-load provided over a single magnetic bearing configuration. Again, as noted above, the radial stiffness provided by the two magnetic bearing configuration can be augmented further as required by other means including, but not limited to, the use of a hydrodynamic bearing in conjunction with the longer hub shaft 116.

The magnetic bearing 700 is comprised of a first annular disc 126 attached to the stator 112 and an axially magnetized region 148 of the spindle magnet 144 attached to the rotor 117. Below the stator windings 120, a first annular disc 126 is disposed on the base of the stator 112 forming the lower portion of the magnetic bearing. The first annular disc 126 includes an outer portion 127 extending from its periphery inward formed from a single pole magnet ring 128. The single pole magnet ring 128 is oriented parallel to the axis of rotation, with the south pole facing the rotor 117.

Between the base of the stator 112 and the magnet ring 128 lies a non-magnetic spacer ring region 130. The spacer ring 130 may be eliminated or reduced in size to accommodate more poles in the magnetic ring 128 as required for any particular application. If eliminated, then some means of restricting the magnetic path through the shaft must be accomplished in order to maintain magnetic circuit integrity.

The rotor 117 is substantially drum shaped with a centrally disposed hub shaft 116 extending from the interior of the drum for engaging with the axial pivot 704. The rotor 117 further comprises a top 138, interior face 139, exterior side 140 and interior wall 142. Disposed on the interior wall 142 is a spindle permanent magnet 144 in opposition to the laminated steel stack 122 of the stator windings 120. The spindle permanent magnet 144 comprises a first 145 and second end 146. The first end 145 further comprises a plurality of radially aligned poles stacked in opposition to the stator laminated steel stack 122, thereby allowing for the movement of the rotor about the stator as the coil windings 124 are alternatively energized. The second end 146 of the spindle permanent magnet 144 comprises a non-magnetized region 147 and axially magnetized region 148 which forms the top portion of the magnetic bearing.

The axially magnetized region 148 comprises a complementary single pole magnet ring 149 disposed on the interior wall 142 of the rotor 117 so as to align perfectly over the first magnet ring 128 of the annular disc 126. The complementary single pole magnet ring 149 comprises a like oriented axially aligned pole which is aligned in attraction mode over the top of the opposing pole of the first annular disc 126. In the this embodiment, the top and bottom portions of the magnetic bearing (annular disc 126 and complementary axially magnetized region 148) are separated by a gap of 0.25 mm.

The second magnetic bearing 702 is comprised of a bottom annular disc 710 attached to the stator 112 and a top annular disc 712 attached to the rotor 117. The bottom annular disc 710 is fixedly attached and journaled about the stator 112. The stator 112 includes a top portion 706 configured for receiving the hub shaft 116 at the stator well 154. The bottom annular disc 710 is comprised of a single axially aligned pole which lies above the stator winding assembly 120, and directly over the spindle permanent magnet 144 of the rotating shaft motor. The pole is oriented with a north pole facing the spindle permanent magnet 144.

Superimposed over the bottom annular disc 710 is the top annular disc 712 including a like axially aligned pole which is oriented in attraction mode with respect to the opposing pole on the bottom annular disc 710. The top annular disc 712 is fixedly attached to the underside of the rotor 117 in a recess 714 on the interior face 139 by an adhesive. In this embodiment, the interior face 139 of the rotor 117 includes a recess 714 located at the junction of the interior face 139 and the interior wall 142 extending about the entire circumference of the interior of the rotor 117. The recess 714 provides a mounting location for the top annular disc 712 directly opposing the bottom annular disc 710. The top annular disc 712 includes an aperture 720 which allows the annular disc to be mounted to the interior face 139 of the rotor 117. In this configuration, the hub shaft 116 passes through the aperture 720 extending into the stator well 154 forming a junction with the stator 112 at the pivot 704. The aperture 720 must at least allow for the hub shaft to pass, but may be larger depending on the configuration of the magnets in the magnetic bearing 702. In this embodiment a gap of 0.25 mm is maintained between the annular discs so as to maintain stability of the bearing assembly.

Figure 8:
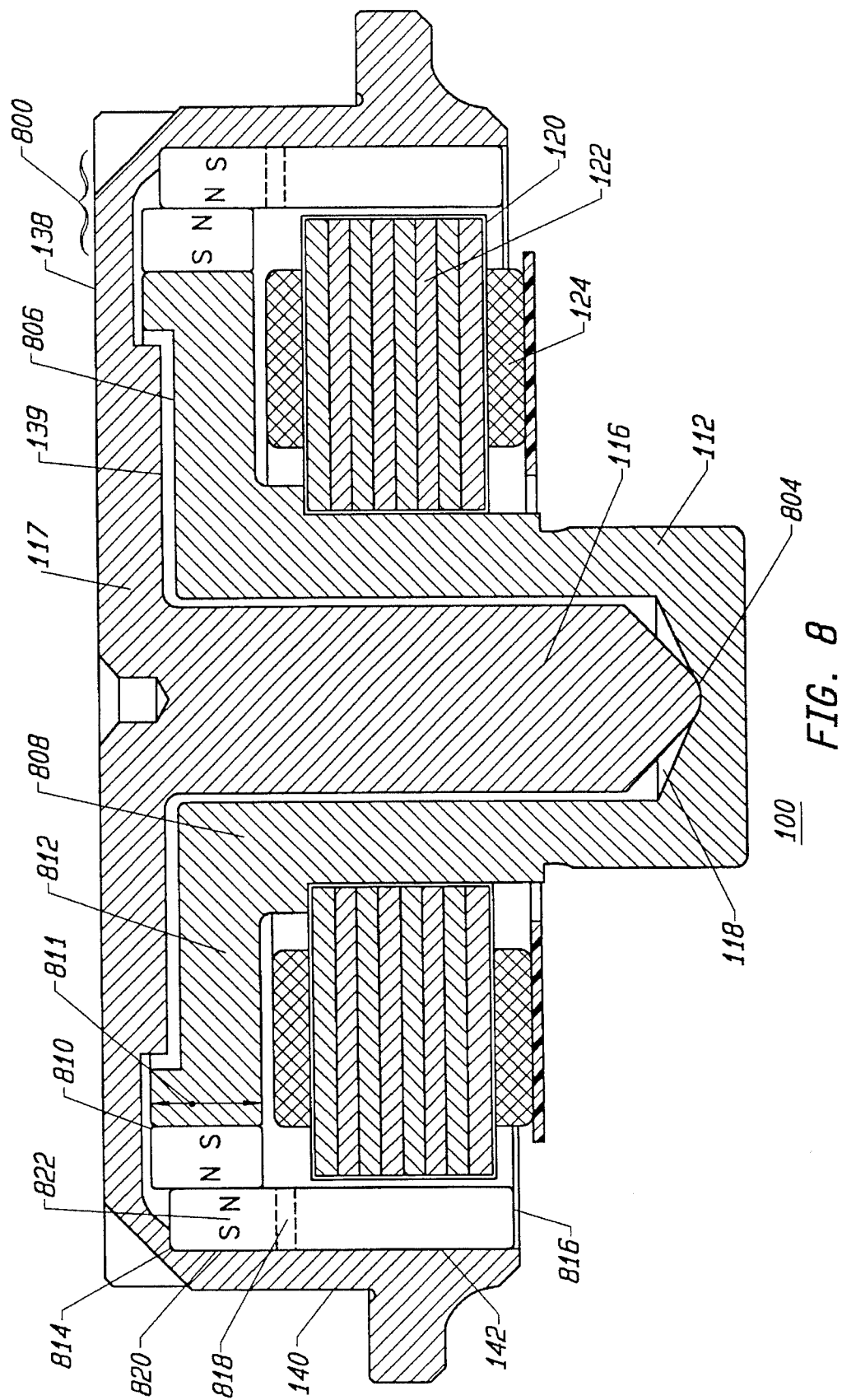
FIG. 8 is a cut away view of a disc drive incorporating a fifth embodiment of the present invention including a top mounted magnetic bearing in repulsion mode with partial offset.

Referring next to FIG. 8, a sixth embodiment of the present invention will be described using like numbers to describe like parts. In this embodiment, a spindle motor 100 is provided including a larger magnetic bearing 800 on top of the motor with a bottom pivot 804 as well as a taller laminated steel stack 122. Those ordinarily skilled in the art will recognize that as the size of the laminated steel stack 122 is increased to improve motor performance, a corresponding increases occurs in the attractive forces (radial) of the permanent magnet of the spindle motor to the steel of the stator. In order to maintain rotor balance, these forces must be offset. In this embodiment, a larger magnetic bearing (1.0 mm diameter, 2.0 mm height annular disc) configuration was selected to accommodate for the larger radial attractive forces describe above, thereby increasing the radial stiffness and axial pre-load provided over a smaller magnetic bearing configuration. Specifically, the magnetic bearing 800 is provided in repulsion mode with a radial orientation thereby providing a strong counter force to the attractive radial forces of the permanent magnet on the rotor to the stator steel. Spindle motor assembly 100 includes a stator 112 having an axial pivot 804 around which a hub shaft 116 of the rotor 117 rotates. In this embodiment of the present invention a hydrodynamic bearing 118 facilitates the pivoting of the hub shaft 116 about the stator 112. Those ordinarily skilled in the art will recognize that a plurality of bearing types may be utilized at the axial pivot 804 including conventional, ceramic or ruby ball bearing systems, and as such the disclosure of a hydrodynamic bearing should in no way be construed as limiting. Additionally, the present invention is equally suited for fixed as well as a rotating shaft system as disclosed in the first embodiment.

Disposed on the fixed stator 112 is a plurality of stator windings 120 each comprising a laminated steel stack 122 surrounded by coil windings 124. The motor as shown depicts a laminated stator but it may also be of the ironless or basketweave type with low air gap unbalance force. Above the stator windings 120, a first annular disc 806 is disposed on the top portion 808 of the stator 112 forming the inside portion of the magnetic bearing. The first annular disc 806 includes a single pole magnet ring 810 disposed on a raised flange 811. The single pole magnet ring 810 is oriented perpendicular to the axis of rotation, with the north pole facing the interior wall 140 of the rotor 117.

Between the base of the stator 112 and the magnet ring 810 lies a non-magnetic spacer ring region 812. The spacer ring region 812 may be eliminated or reduced in size to accommodate more poles in the magnetic ring 800 as required for any particular application. If eliminated, then some means of restricting the magnetic path through the shaft must be accomplished in order to maintain magnetic circuit integrity.

The rotor 117 is substantially drum shaped with a centrally disposed hub shaft 116 extending from the interior of the drum for engaging with the axial pivot 804. The rotor 117 further comprises a top 138, interior face 139, exterior side 140 and interior wall 142. The interior face is recessed at the junction of the interior wall 142 and interior face 139 to allow for the rotation of the rotor 117 over the raised portion of the stator at the magnet ring 810 and raised flange 811. The spindle permanent magnet 144 is disposed on the interior wall 142 of the rotor 117, and extends along the interior wall 142 in opposition to the laminated steel stack 122 of the stator windings 120.

The spindle permanent magnet 144 comprises a first 814 and second end 816. The second end 816 further comprises a plurality of radially aligned poles stacked in opposition to the stator laminated steel stack 122 and allow for the movement of the rotor about the stator as the coil windings 124 are alternatively energized. The first end 814 of the spindle permanent magnet 144 comprises a non-magnetized region 818 and axially magnetized region 820 which forms the outside portion of the magnetic bearing.

The axially magnetized region 820 comprises a second complementary single pole magnet ring 822 disposed in the interior wall 142 of the rotor 117 so as to lie in offset with respect to the first magnet ring 810 of the annular disc 806. The complementary single pole magnet ring 822 comprises a oppositely oriented radially aligned pole which is aligned in repulsion mode offset from the opposing pole of the first annular disc 806. In this embodiment, the magnet ring 810 lies in opposition to complementary magnet ring 822, with an offset of 0.25 mm in height and separated by a gap of 0.25 mm. As the coils of the stator assembly 120 are alternately energized, the interaction of the magnetic fields with the current flow will result in movement of the rotor 117 about the pivot 804.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims. Specifically, reference has been made to magnetic bearing systems (including hydrodynamic bearings) for use in axial pivots. Those ordinarily skilled in the art will recognize that the description is equally suited to radial pivot applications, orientation merely an engineering choice without import to the considerations disclosed herein.

What is claimed is:

1. In a disc drive having a spindle motor assembly comprised of a spindle permanent magnet held in opposition to an electromagnet assembly, an apparatus for journaling a rotor about a stator of said spindle motor comprising:

a pivot, said pivot for pivotally displacing said rotor about said stator;

a first annular disc, said disc comprising an axially aligned magnetic pole, said disc radially extending from said stator; and a spindle permanent magnet having a first and second end and non-magnetized region disposed there between, said first end comprising a plurality of magnetic poles disposed on said rotor in opposition to said spindle motor electromagnet assembly, said second end comprised of a like axially aligned magnetic pole disposed on said rotor and opposing said axially aligned magnetic pole on said first annular disc.

2. The apparatus of claim 1 wherein said first annular disc is disposed 0.25 mm beneath said axially magnetized region.

3. The apparatus of claim 1 wherein said pivot is a hydrodynamic bearing.

4. The apparatus of claim 1 wherein said pivot is a conventional ball bearing.

5. The apparatus of claim 1 wherein said pivot is a ruby ball bearing.

6. The apparatus of claim 1 wherein said pivot is a ceramic ball bearing.

7. The apparatus of claim 1 wherein said first annular disc further comprises an annular shaped magnetic permeable spacer region disposed between said plurality of axially aligned magnetic poles and said stator, said magnetic permeable spacer region providing a magnetic flux return for increasing efficiency of the magnetic bearing.

8. In a disc drive having a spindle motor assembly comprised of a spindle permanent magnet held in opposition to an electromagnet assembly, an apparatus for journaling a rotor about a stator in a spindle motor of a disc drive comprising:

a shaft centrally disposed on said rotor;

a reservoir in said stator for receiving said shaft;

hydrodynamic bearing means comprising means for maintaining radial stiffness of said rotor with respect to said stator while said bearing means is operational; and alignment means for centering said rotor about said stator during non-operational periods, said alignment means comprising a magnetic bearing having one pole integral to said spindle permanent magnet, a first annular disc, said disc comprising an axially aligned magnetic pole, said disc radially extending from said stator; and a spindle permanent magnet having a first and second end and non-magnetized region disposed there between, said first end comprising a plurality of magnetic poles disposed on said rotor in opposition to said spindle motor electromagnetic assembly, said second end comprised of a like axially aligned magnetic pole disposed on said rotor and opposing said axially aligned magnetic pole on said first annular disc.

9. The apparatus of claim 8 wherein said bearing means is a hydrodynamic bearing.

10. The apparatus of claim 8 wherein said first annular disc is disposed 0.25 mm beneath said axially magnetized region.

11. The apparatus of claim 8 wherein said first annular disc further comprises an annular shaped magnetic permeable spacer region disposed between said plurality of axially aligned magnetic poles and said stator, said magnetic permeable spacer region providing a magnetic flux return for increasing efficiency of the magnetic bearing.

12. In a disc drive having a spindle motor assembly comprised of a spindle permanent magnet held in opposition to an electromagnet assembly, an apparatus for journaling a rotor about a stator in a spindle motor of a disc drive comprising:

a pivot, said pivot for pivotally displacing said rotor about said stator;

a first annular disc, said disc comprising an axially aligned magnetic pole, said disc radially extending from said stator;

a spindle permanent magnet having a first and second end and non-magnetized region disposed there between, said first end comprising a plurality of magnetic poles disposed on said rotor in opposition to said spindle motor electromagnet assembly, said second end comprised of a like axially aligned magnetic pole disposed on said rotor and opposing said axially aligned magnetic pole on said first annular disc; and stiffener means for providing directional stiffness perpendicular to the axis of orientation of said magnetic poles.

13. The apparatus of claim 12 wherein said stiffener means comprises a magnetic bearing.

14. The apparatus of claim 13 wherein said magnetic bearing comprises:

a second annular disc, said second annular disc comprising an second axially aligned magnetic pole, said second annular disc fixably attached to a top portion of said stator, said second annular disc having an aperture for receiving said pivot; and a third annular disc, said third annular disc comprising a second like axially aligned magnetic pole, said third disc fixably attached to said rotor opposing said second annular disc.

15. The apparatus of claim 13 wherein said magnetic bearing comprises:

a second annular disc, said second annular disc comprising an second axially aligned magnetic pole, said disc fixably attached to a top portion of said stator, said second annular disc having an aperture for receiving said pivot; and a third annular disc, said third annular disc comprising a second like axially aligned magnetic pole, said third disc disposed in a first recess in said rotor opposing said axially magnetized region.

16. The apparatus of claim 15 wherein said rotor includes a magnetically permeable region disposed to the inside and adjacent to said recess, said magnetic permeable spacer region providing a magnetic flux return for increasing efficiency of the magnetic bearing.

17. The apparatus of claim 12 wherein said stiffener means comprises a hydrodynamic bearing.

18. The apparatus of claim 12 wherein said first annular disc further comprises an annular shaped magnetic permeable spacer region disposed between said plurality of axially aligned magnetic poles and said stator, said magnetic permeable spacer region providing a magnetic flux return for increasing efficiency of the magnetic bearing.

19. In a disc drive having a spindle motor assembly comprised of a spindle permanent magnet held in opposition to an electromagnet assembly, an apparatus for journaling a rotor about a stator in a spindle motor of a disc drive comprising:

a pivot, said pivot for pivotally displacing said rotor about said stator;

a first annular disc, said disc comprising an axially aligned magnetic pole, said disc radially extending from said stator; and a spindle permanent magnet having a first and second end and spacer region disposed there between, said first end comprising a plurality of magnetic poles disposed on said rotor in opposition to said spindle motor electromagnet assembly, said spacer region comprised of a non-magnetized region opposing said axially aligned magnetic pole on said first annular disc, said second end comprised of a like axially aligned magnetic pole disposed in a first recess in said rotor completely offset from said first annular disc, said axially aligned magnetic pole oriented oppositely to said like axially aligned magnetic pole.

20. The apparatus of claim 19 wherein said first annular disc further comprises an annular shaped magnetic permeable spacer region disposed between said plurality of axially aligned magnetic poles and said stator, said magnetic permeable spacer region providing a magnetic flux return for increasing efficiency of the magnetic bearing.

21. The apparatus of claim 19 wherein said rotor includes a magnetically permeable region disposed to the inside and adjacent to said recess, said magnetic permeable spacer region providing a magnetic flux return for increasing efficiency of the magnetic bearing.

22. In a disc drive having a spindle motor assembly comprised of a spindle permanent magnet held in opposition to an electromagnet assembly, an apparatus for journaling a rotor about a stator in a spindle motor of a disc drive comprising:

a pivot, said pivot for pivotally displacing said rotor about said stator;

a first annular disc, said disc comprising an axially aligned magnetic pole, said disc radially extending from said stator;

a spindle permanent magnet having a first and second end and spacer region disposed there between, said first end comprising a plurality of magnetic poles disposed on said rotor in opposition to said spindle motor electromagnet assembly, said spacer region comprised of a non-magnetized region opposing said axially aligned magnetic pole on said first annular disc, said second end comprised of a like axially aligned magnetic pole disposed in a first recess in said rotor completely offset from said first annular disc, said axially aligned magnetic pole oriented oppositely to said like axially aligned magnetic pole; and stiffener means for providing directional stiffness perpendicular to the axis of orientation of said magnetic poles.

23. The apparatus of claim 22 wherein said stiffener means comprises a hydrodynamic bearing.

24. The apparatus of claim 23 wherein said first annular disc further comprises an annular shaped magnetic permeable spacer region disposed between said plurality of axially aligned magnetic poles and said stator, said magnetic permeable spacer region providing a magnetic flux return for increasing efficiency of the magnetic bearing.

25. The apparatus of claim 22 wherein said first annular disc further comprises an annular shaped magnetic permeable spacer region disposed between said plurality of axially aligned magnetic poles and said stator, said magnetic permeable spacer region providing a magnetic flux return for increasing efficiency of the magnetic bearing.

26. The apparatus of claim 22 wherein said rotor includes a magnetically permeable region disposed to the inside and adjacent to said recess, said magnetic permeable spacer region providing a magnetic flux return for increasing efficiency of the magnetic bearing.

27. In a disc drive having a spindle motor assembly comprised of a spindle permanent magnet held in opposition to an electromagnet assembly, an apparatus for journaling a rotor about a stator in a spindle motor of a disc drive comprising:

a pivot, said pivot for pivotally displacing said rotor about said stator;

a first annular disc, said disc comprising an radially aligned magnetic pole, said disc radially extending from said stator; and a spindle permanent magnet having a first and second end and non-magnetized region disposed there between, said first end comprising a plurality of magnetic poles disposed on said rotor in opposition to said spindle motor electromagnet assembly, said second end comprised of a like radially aligned magnetic pole disposed opposite said axially aligned magnetic pole on said first annular disc.

28. The apparatus of claim 27 wherein said first annular disc further comprises an annular shaped magnetic permeable spacer region disposed between said plurality of axially aligned magnetic poles and said stator, said magnetic permeable spacer region providing a magnetic flux return for increasing efficiency of the magnetic bearing.

29. In a disc drive having a spindle motor assembly comprised of a spindle permanent magnet held in opposition to an electromagnet assembly, an apparatus for journaling a rotor about a stator in a spindle motor of a disc drive comprising:

a pivot, said pivot for pivotally displacing said rotor about said stator;

a first annular disc, said disc comprising an radially aligned magnetic pole, said disc radially extending from said stator;

a spindle permanent magnet having a first and second end and non-magnetized region disposed there between, said first end comprising a plurality of magnetic poles disposed on said rotor in opposition to said spindle motor electromagnet assembly, said second end comprised of a like radially aligned magnetic pole disposed on said rotor and opposing to, and offset from, said radially aligned magnetic pole on said first annular disc, said radially aligned magnetic pole oriented oppositely to said like radially aligned magnetic pole; and stiffener means for providing directional stiffness perpendicular to the axis of orientation of said magnetic poles.

30. The apparatus of claim 29 wherein said stiffener means comprises a magnetic bearing.

31. The apparatus of claim 30 wherein said magnetic bearing comprises:

a second annular disc, said second annular disc comprising an second axially aligned magnetic pole, said disc fixably attached to a top portion of said stator, said second annular disc having an aperture for receiving said pivot; and a third annular disc, said third annular disc comprising a second like axially aligned magnetic pole, said third disc disposed in a first recess in said rotor opposing said axially magnetized region.

32. The apparatus of claim 29 wherein said first annular disc further comprises an annular shaped magnetic permeable spacer region disposed between said plurality of axially aligned magnetic poles and said stator, said magnetic permeable spacer region providing a magnetic flux return for increasing efficiency of the magnetic bearing.

* * * * *